(12) United States Patent
Weydahl

(10) Patent No.: US 8,709,769 B2
(45) Date of Patent: *Apr. 29, 2014

(54) PROCESS FOR THE PRODUCTION OF ALCOHOL

(75) Inventor: Karl Ragnar Weydahl, Bergen (NO)

(73) Assignee: Weyland AS, Radal (NO)

( * ) Notice: Subject to any disclaimer, the term of this patent is extended or adjusted under 35 U.S.C. 154(b) by 0 days.

This patent is subject to a terminal disclaimer.

(21) Appl. No.: 13/125,069

(22) PCT Filed: Oct. 2, 2009

(86) PCT No.: PCT/GB2009/002349
§ 371 (c)(1),
(2), (4) Date: Jul. 22, 2011

(87) PCT Pub. No.: WO2010/046619
PCT Pub. Date: Apr. 29, 2010

(65) Prior Publication Data
US 2011/0294181 A1    Dec. 1, 2011

(30) Foreign Application Priority Data

Oct. 22, 2008 (GB) .................................. 0819406.0

(51) Int. Cl.
*C12P 7/08* (2006.01)
*C13K 1/02* (2006.01)

(52) U.S. Cl.
USPC ............................................ 435/163; 127/37

(58) Field of Classification Search
USPC ................................. 127/37; 44/589; 435/163
See application file for complete search history.

(56) References Cited

U.S. PATENT DOCUMENTS

| | | | |
|---|---|---|---|
| 3,212,933 | A | 10/1965 | Hess et al. |
| 3,398,129 | A | 8/1968 | Leibson et al. |
| 4,057,486 | A | 11/1977 | Meadus et al. |
| 4,237,110 | A | 12/1980 | Forster et al. |
| 4,608,245 | A | 8/1986 | Gaddy et al. |
| 4,645,658 | A | 2/1987 | Gaddy et al. |
| 4,906,329 | A | 3/1990 | Tominari et al. |
| 4,941,944 | A | 7/1990 | Chang |
| 5,053,563 | A | 10/1991 | Horizoe et al. |
| 5,314,579 | A | 5/1994 | Sung |
| 5,370,999 | A | 12/1994 | Stuart |
| 5,681,427 | A | 10/1997 | Lora et al. |
| 5,723,433 | A | 3/1998 | Duvall et al. |
| 5,735,916 | A | 4/1998 | Lucas |
| 5,868,851 | A | 2/1999 | Lightner |
| 5,959,144 | A | 9/1999 | Baniel |
| 6,007,636 | A | 12/1999 | Lightner |
| 6,441,202 | B1 | 8/2002 | Lightner |
| 2002/0010382 | A1 | 1/2002 | Taylor |
| 2002/0021994 | A1 | 2/2002 | Blue |
| 2003/0199049 | A1 | 10/2003 | Nguyen |
| 2010/0284900 | A1 | 11/2010 | Chen |

FOREIGN PATENT DOCUMENTS

| | | |
|---|---|---|
| CN | 101157445 | 4/2008 |
| EP | 0018621 | 11/1980 |
| GB | 376323 | 7/1932 |
| GB | 602833 | 6/1948 |
| WO | 9967409 | 12/1999 |
| WO | 2002002826 A1 | 1/2002 |
| WO | 2007019505 A2 | 2/2007 |
| WO | 2007051269 | 5/2007 |
| WO | 2007111605 | 10/2007 |
| WO | 2008111045 A1 | 9/2008 |
| WO | 2009/036674 A1 | 3/2009 |
| WO | 2010038021 A2 | 4/2010 |

OTHER PUBLICATIONS

Office Action published in U.S. Appl. No. 13/378,655 on Nov. 16, 2012.
Dempster HS et al. Tracing Organic Contaminants in Groundwater: A New Methodology Using Compound-Specific Isotopic Analysis 1997. Environmental Science and Technology. 31:3193-3197.
Applicants Co-Pending, U.S. Appl. No. 13/122,296, for Method of Production of Alcohol, US 2011-0312055 A1, cited in accordance with MPEP Jun. 2001(b).
Applicants Co-Pending, U.S. Appl. No. 13/378,655, for Method of Alcohol Production, cited in accordance with MPEP Jun. 2001(b), filed Feb. 21, 2012, US20120135489.
European Patent Office, "International Search Report and Written Opinion", PCT/GB2009/002349, Nov. 19, 2009.

(Continued)

*Primary Examiner* — Maryam Monshipouri
(74) *Attorney, Agent, or Firm* — IPHORGAN Ltd.

(57) ABSTRACT

The invention provides a process for producing alcohol from a cellulosic material, said process comprising the steps of: (i) hydrolyzing said cellulosic material with an aqueous acid to produce a hydrolysate; (ii) extracting acid and water from said hydrolysate with a water-miscible organic extraction solvent to yield (a) a first aqueous acidic solution containing said extraction solvent and (b) a residue containing sugars, —(iii) subjecting said residue to an oligosaccharide cleavage reaction to yield an aqueous solution of fermentable sugars; (iv) fermenting said fermentable sugars and distilling alcohol from the resulting fermented mixture; (v) evaporating said extraction solvent from said first solution to yield (a) a second aqueous acid solution containing no more than 10% wt., preferably no more than 5% wt., of said extraction solvent and (b) gaseous extraction solvent; (vi) condensing said gaseous extraction solvent for recycling; and, optionally, (vii) concentrating said second aqueous acid solution for recycling; wherein said extraction solvent is liquid at the temperature and pressure of step (ii), has a boiling point of from 25 to 60° C. at a pressure in the range 1 to 8 bar, and is such that water-soluble oligosaccharides are precipitated from solution by its addition in step (ii).

17 Claims, 4 Drawing Sheets

(56) References Cited

OTHER PUBLICATIONS

Restriction Requirement issued in U.S. Appl. No. 13/122,296 on Aug. 9, 2012.
Restriction Requirement issued in U.S. Appl. No. 13/378,655 on Aug. 23, 2012.
Office Action and Notice of References Cited issued by the US Patent and Trademark Office in copending U.S. Appl. No. 13/122,296 on Feb. 13, 2013.
Applicants Copending U.S. Appl. No. 13/318,302 (Publication Nos. US 2012-0190840 A1; WO 2010/128272, published by WIPO Nov. 11, 2010), indicated as copending by USPTO Examiner in Office Action issued Feb. 13, 2013 in copending Appl. No. 13/122,296, and Office Action issued Nov. 16, 2012 in copending Appl. No. 13/378,655.
European Patent Office (International Search Authority), International Search Report and Written Opinion, PCT/GB2010/000791, Sep. 28, 2010, corresponding to U.S. Appl. No. 13/318,302.
United Kingdom Intellectual Property Office, Search Report, United Kingdom Patent Application No. GB0907879.1, Sep. 4, 2009.
European Patent Office (International Search Authority), International Search Report and Written Opinion, PCT/GB2009/002333, Jul. 2, 2010, corresponding to U.S. Appl. No. 13/122,296.
European Patent Office (International Search Authority), International Search Report and Written Opinion, PCT/GB2010/001120, Aug. 25, 2011, corresponding to U.S. Appl. No. 13/378,655.
Office Action and Notice of References Cited issued Nov. 15, 2013 in U.S. Appl. No. 13/122,296, US 2011-0312055 A1.
United States Patent & Trademark office: Office Action issued in co-pending U.S. Appl. No. 13/378,655 on Aug. 2, 2013.
Brignole et al, "Supercritical Fluid Extraction of Alcohols from Water" Ind. Eng. Chem Res. 2:254-61 (1987).
Posthill et at "Portable Power Sources Using Combustion of Butane and Thermoelectrics" International Conf. Thermoelec. pages 520-523 (2005).
Gros et al., "High pressure phase equilibrium modeling of mixtures containing associating compounds and gases" Fluid Phase Equilibria 139:75-87 (1997).
Ege, SN. Organic Chemistry: Structure and Reactivity Fifth Edition. 2004. p. 159.
Fisher Scientific MSDS for Pentane. 2008. pp. 1-7.
Goodwin. Benzene Thermophysical Properties from 279-900 K at Pressures to 1000 Bar. 1988. 17:1541-1636.

PROCESS FOR THE PRODUCTION OF ALCOHOL

This application is a 371 of PCT/GB2009/002349, filed Oct. 2, 2009, which claims priority to British Application No. 0819406.0 filed Oct. 22, 2008.

The invention relates to improvements in and relating to a process for the production of alcohol, particularly ethanol and butanol, especially ethanol, from cellulosic materials, in particular a process involving acid hydrolysis of cellulose.

Ethanol, produced by fermenting the sugars from waste or biomass, is rapidly becoming a major alternative to hydrocarbons such as natural gas and petroleum. While the current focus is on the production of ethanol from plant seed, e.g. maize, the magnitude of the demand for ethanol threatens a reduction in the land area devoted to food production and a desirable alternative to plant seed as the starting material is plant material other than seed, e.g. grass, wood, paper, maize husks, straw, etc. In this case the ethanol is produced by first breaking down the cellulose and hemicellulose (for convenience both are simply referred to as cellulose herein) into fermentable sugars. This may be done with enzymes but it is achieved most efficiently and economically by hydrolysis with strong acids, for example mineral acids such as sulphuric and hydrochloric acid. However for large scale commercial production of ethanol in this way, a major portion of the acid used must be recovered and recycled. Besides ethanol, other alcohols, for example butanol, may be produced by fermenting such fermentable sugars.

In WO 02/02826, the contents of which are hereby incorporated by reference, the inventors proposed such an ethanol production process in which the strong acid was recovered by contacting the hydrolysate with an organic extraction solvent, for example methyl ethyl ketone, with separation of the solid lignin and precipitated sugars to yield an acid solution comprising water, extraction solvent, acid and some dissolved sugars. The extraction solvent in the acid solution was then evaporated off under vacuum to be recycled and to leave an aqueous acid and sugar solution which was further evaporated off to yield a concentrated acid/sugar mixture, again for recycling.

The hydrolysate:extraction solvent ratio used in WO 02/02826 (see Example 1) is of the order of 3:8 and accordingly the energy requirement for recovery of the extraction solvent for recycling is a major portion of the overall energy demand for converting the cellulosic raw material into distilled ethanol.

Figure 1:
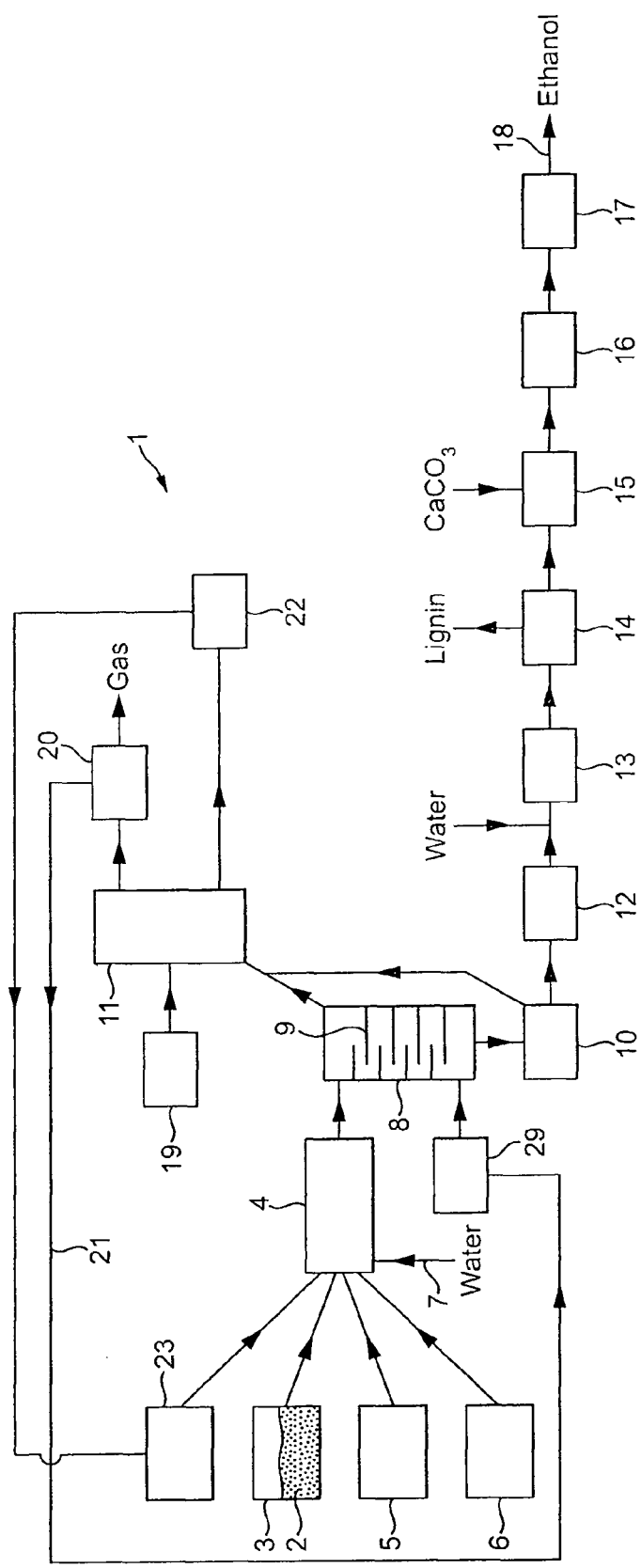
FIG. 1 is a schematic diagram of an apparatus according to the invention.

We have now found that the extraction solvent recovery may be effected efficiently and with significantly lower energy demand by using as the extraction solvent an at least partially water-miscible organic solvent which has a boiling point of from 25 to 60° C. at a pressure in the range 1 to 8 bar in which water-soluble oligosaccharides are substantially insoluble, e.g. one which consists of or contains a solvent having a boiling point at 1 bar below 20° C. or a $C_{2-3}$ ether. References hereinafter to solvents as being water-miscible shall thus include solvents which are partially water-miscible as well as ones which are fully water-miscible.

Thus viewed from one aspect the invention provides a process for producing alcohol from a cellulosic material, said process comprising the steps of:

(i) hydrolyzing said cellulosic material with an aqueous acid to produce a hydrolysate;

(ii) extracting acid and water from said hydrolysate with a water-miscible organic extraction solvent to yield (a) a first aqueous acidic solution containing said extraction solvent and (b) a residue containing sugars;

(iii) subjecting said residue to an oligosaccharide cleavage reaction to yield an aqueous solution of fermentable sugars;

(iv) fermenting said fermentable sugars and distilling alcohol from the resulting fermented mixture;

(v) evaporating said extraction solvent from said first solution to yield (a) a second aqueous acid solution containing no more than 10% wt., preferably no more than 5% wt., of said extraction solvent and (b) gaseous extraction solvent;

(vi) condensing said gaseous extraction solvent for recycling; and, optionally, (vii) concentrating said second aqueous acid solution for recycling;

wherein said extraction solvent is liquid at the temperature and pressure of step (ii), has a boiling point of from 25 to 60° C. at a pressure in the range 1 to 8 bar, comprises a solvent having a boiling point at 1 bar of below 20° C., and is such that water-soluble oligosaccharides are precipitated from solution by its addition in step (ii).

The extraction step, step (ii), may be effected under ambient or elevated pressure, e.g. 1 to 10 bar, preferably 1 to 6 bar, especially 2 to 5 bar, particularly about 2.5 bar. It will generally be effected at reduced, ambient or elevated temperature, e.g. 5 to 70° C., preferably 10 to 50° C., especially 15 to 30° C., more particularly 20 to 25° C. Preferably, the extraction step is performed at a temperature within 15 C.° of that of step (i), especially within 10 C.° and a pressure within 1 bar of that of step (i), especially within 0.5 bar.

The evaporation step, step (v), may also be performed at ambient or elevated pressure, e.g. up to 8 bar, preferably 0.25 to 5 bar, and at a temperature of 25 to 60° C., preferably 40 to 55° C. It is particularly desirable that this step not be performed above 80° C. The temperature and pressure combination however will be one at which the extraction solvent is gaseous. Preferably, the evaporation step is performed at a temperature within 15 C.° of the temperature of step (ii), especially within 10 C.°. Likewise, the evaporation step is preferably performed at a pressure within 5 bar of that of step (ii), especially within 3 bar. Thus it is preferred to carry out step (ii) under elevated pressure and step (v) under a lower pressure.

The condensation step, step (vi), is preferably effected at a temperature in the range 0 to 60° C., especially 20 to 55° C., and at ambient or elevated pressure, e.g. up to 10 bar, especially up to 6 bar. The temperature and pressure combination however should be one at which the extraction solvent is liquid. Desirably, the condensation step is performed at ambient pressure using uncooled water. Preferably, the condensation step is effected at a temperature within 15 C.° of that of step (ii), especially within 10 C.°, and a pressure within 1 bar of that of step (ii), especially within 0.5 bar. Cooling to effect condensation is preferably effected using water from the local environment, e.g. from a river, a lake or, especially, the sea.

The condensed extraction solvent yielded by step (vi) may of course contain water; however the water content will generally not be so high as to prevent oligosaccharide precipitation in step (ii). If desired, the recycled extraction solvent may be combined with fresh extraction solvent for step (ii).

The condensed extraction solvent is then desirably repressurized and recycled into the extraction step.

The extraction solvent may be a single solvent compound or a combination of at least two compounds. The compounds will typically be selected from alcohols, ethers and ketones with up to eight carbons, more preferably up to four carbons, per molecule; however, other water-miscible organic solvents may be used. Preferably the compounds are not ones which are highly toxic to yeasts as some of the extraction solvent may be carried over to the fermentation step. Examples of preferred compounds include dimethyl ether, methyl ethyl ether, acetone, methanol, ethanol, n-propanol, and iso-propanol. Compounds such as dimethyl ether which have boiling points at 1 bar below 20° C. will generally be used as one component of a solvent mixture in this aspect of the invention.

Suitable solvent mixtures having boiling points within the temperature and pressure windows (the "TP windows") mentioned above may be produced using simple laboratory experimentation, e.g. by determining the surface of the boiling point in a three-dimensional plot of boiling temperature, pressure, and relative concentration for mixtures of two (or more) solvents. By way of example, mixtures of dimethyl ether and ethanol have boiling points within the TP windows in relative volume ratios of about 1:5 to 5:1. Further examples are set out below in the Examples and the accompanying Figures.

The use of $C_{2-3}$ ethers, especially methyl ethyl ether and particularly dimethyl ether, as or as part of the extraction solvent is of itself novel and forms a further aspect of the invention. Where dimethyl ether is used alone as the extraction solvent, the extraction and condensation steps are preferably effected under elevated pressure such that the boiling and condensation points of dimethyl ether at the pressures used are respectively at least 50° C. and at least 0° C., especially at least 60° C. and at least 26° C. respectively.

Thus viewed from a further aspect the invention provides a process for producing alcohol from a cellulosic material, said process comprising the steps of:
(i) hydrolyzing said cellulosic material with an aqueous acid to produce a hydrolysate;
(ii) extracting acid and water from said hydrolysate with a water-miscible organic extraction solvent comprising a $C_{2-3}$ ether to yield (a) a first aqueous acidic solution containing said extraction solvent and (b) a residue containing sugars;
(iii) subjecting said residue to an oligosaccharide cleavage reaction to yield an aqueous solution of fermentable sugars;
(iv) fermenting said fermentable sugars and distilling alcohol from the resulting fermented mixture;
(v) evaporating said extraction solvent from said first solution to yield (a) a second aqueous acid solution containing no more than 10% wt., preferably no more than 5% wt., of said extraction solvent and (b) gaseous extraction solvent;
(vi) condensing said gaseous extraction solvent for recycling; and, optionally,
(vii) concentrating said second aqueous acid solution for recycling;
wherein said extraction solvent is liquid at the temperature and pressure of step (ii) and is such that water-soluble oligosaccharides are precipitated from solution by its addition in step (ii).

In this aspect of the invention the extraction solvent will typically be 1 to 100% wt. $C_{2-3}$ ether, especially 10-100% wt., particularly 20-90% wt.

By selection of the extraction solvent as described, the recovery of the acid and extraction solvent may be performed with greater energy efficiency than hitherto and this forms a further aspect of the invention. Viewed from this aspect the invention provides a process for producing alcohol from a cellulosic material, said process comprising the steps of:
(i) hydrolyzing said cellulosic material with an aqueous acid to produce a hydrolysate;
(ii) extracting acid and water from said hydrolysate with a water-miscible organic extraction solvent to yield (a) a first aqueous acidic solution containing said extraction solvent and (b) a residue containing sugars;
(iii) subjecting said residue to an oligosaccharide cleavage reaction to yield an aqueous solution of fermentable sugars;
(iv) fermenting said fermentable sugars and distilling alcohol from the resulting fermented mixture;
(v) evaporating said extraction solvent from said first solution to yield (a) a second aqueous acid solution containing no more than 10% wt., preferably no more than 5% wt., of said extraction solvent and (b) gaseous extraction solvent;
(vi) condensing said gaseous extraction solvent for recycling; and, optionally,
(vii) concentrating said second aqueous acid solution for recycling;
wherein said extraction solvent is liquid at the temperature and pressure of step (ii), has a boiling point of from 25 to 60° C. at a pressure in the range 1 to 8 bar, and is such that water-soluble oligosaccharides are precipitated from solution by its addition in step (ii), wherein extraction step (ii) is performed at a temperature within 15 C.° and a pressure within 1 bar of the temperature and pressure of hydrolysis step (i), wherein evaporation step (v) is performed at a temperature within 15 C.° and a pressure within 5 bar of the temperature and pressure of extraction step (ii), and wherein condensation step (vi) is performed at a temperature within 15 C.° and a pressure within 1 bar of the temperature and pressure of extraction step (ii).

Viewed from a further aspect the invention provides a process for the production of an aqueous solution of fermentable sugars from a cellulosic material, said process comprising the steps of:
(i) hydrolyzing said cellulosic material with an aqueous acid to produce a hydrolysate;
(ii) extracting acid and water from said hydrolysate with a water-miscible organic extraction solvent to yield (a) a first aqueous acidic solution containing said extraction solvent and (b) a residue containing sugars;
(v) evaporating said extraction solvent from said first solution to yield (a) a second aqueous acid solution containing no more than 10% wt., preferably no more than 5% wt., of said extraction solvent and (b) gaseous extraction solvent;
(vi) condensing said gaseous extraction solvent for recycling; and, optionally,
(vii) concentrating said second aqueous acid solution for recycling;
wherein said extraction solvent is liquid at the temperature and pressure of step (ii), has a boiling point of from 25 to 60° C. at a pressure in the range 1 to 8 bar, and is such that water-soluble oligosaccharides are precipitated from solution by its addition in step (ii), wherein extraction step (ii) is performed at a temperature within 15 C.° and a pressure within 1 bar of the temperature and pressure of hydrolysis step (i), wherein evaporation step (v) is performed at a temperature within 15 C.° and a pressure within 5 bar of the temperature and pressure of extraction step (ii), and wherein condensation step (vi) is performed at a temperature within 15 C.° and a pressure within 1 bar of the temperature and pressure of extraction step (ii).

Viewed from a still further aspect the invention provides a process for the production of a sugar composition from a cellulosic material, said process comprising the steps of:

(i) hydrolyzing said cellulosic material with an aqueous acid to produce a hydrolysate;

(ii) extracting acid and water from said hydrolysate with a water-miscible organic extraction solvent to yield (a) a first aqueous acidic solution containing said extraction solvent and (b) a residue containing sugars;

(iii) drying said residue to yield said sugar composition;

(v) evaporating said extraction solvent from said first solution to yield (a) a second aqueous acid solution containing no more than 10% wt., preferably no more than 5% wt., of said extraction solvent and (b) gaseous extraction solvent;

(vi) condensing said gaseous extraction solvent for recycling; and, optionally, (vii) concentrating said second aqueous acid solution for recycling;

wherein said extraction solvent is liquid at the temperature and pressure of step (ii), has a boiling point of from 25 to 60° C. at a pressure in the range 1 to 8 bar, and is such that water-soluble oligosaccharides are precipitated from solution by its addition in step (ii), wherein extraction step (ii) is performed at a temperature within 15 C.° and a pressure within 1 bar of the temperature and pressure of hydrolysis step (i), wherein evaporation step (v) is performed at a temperature within 15 C.° and a pressure within 5 bar of the temperature and pressure of extraction step (ii), and wherein condensation step (vi) is performed at a temperature within 15 C.° and a pressure within 1 bar of the temperature and pressure of extraction step (ii).

In these processes, it is preferred that extraction step (ii) is performed at a temperature within 10 C.° of the temperature of hydrolysis step (i), that evaporation step (v) is performed at a temperature within 10 C.° of the temperature of extraction step (ii), and that condensation step (vi) is performed at a temperature within 10 C.° of the temperature of extraction step (ii).

The overall alcohol production process may if desired be performed at a set of production sites, e.g. with production of the fermentable sugars on one site and fermentation and distillation at another. Equally, the acid hydrolysis, acid removal and extraction solvent removal may be performed at one site with the oligosaccharide cleavage and other downstream steps being performed at another site.

Thus viewed from a further aspect the invention provides a process for the production of an aqueous solution of fermentable sugars from a cellulosic material, said process comprising the steps of:

(i) hydrolyzing said cellulosic material with an aqueous acid to produce a hydrolysate;

(ii) extracting acid and water from said hydrolysate with a water-miscible organic extraction solvent to yield (a) a first aqueous acidic solution containing said extraction solvent and (b) a residue containing sugars;

(v) evaporating said extraction solvent from said first solution to yield (a) a second aqueous acid solution containing no more than 10% wt., preferably no more than 5% wt., of said extraction solvent and (b) gaseous extraction solvent;

(vi) condensing said gaseous extraction solvent for recycling; and, optionally, (vii) concentrating said second aqueous acid solution for recycling;

wherein said extraction solvent is liquid at the temperature and pressure of step (ii), has a boiling point of from 25 to 60° C. at a pressure in the range 1 to 8 bar, comprises a solvent having a boiling point at 1 bar of below 20° C., and is such that water-soluble oligosaccharides are precipitated from solution by its addition in step (ii).

Viewed from another aspect the invention provides a process for the production of a sugar composition from a cellulosic material, said process comprising the steps of:

(i) hydrolyzing said cellulosic material with an aqueous acid to produce a hydrolysate;

(ii) extracting acid and water from said hydrolysate with a water-miscible organic extraction solvent to yield (a) a first aqueous acidic solution containing said extraction solvent and (b) a residue containing sugars;

(iii) drying said residue to yield said sugar composition;

(v) evaporating said extraction solvent from said first solution to yield (a) a second aqueous acid solution containing no more than 10% wt., preferably no more than 5% wt., of said extraction solvent and (b) gaseous extraction solvent;

(vi) condensing said gaseous extraction solvent for recycling; and, optionally, (vii) concentrating said second aqueous acid solution for recycling;

wherein said extraction solvent is liquid at the temperature and pressure of step (ii), has a boiling point of from 25 to 60° C. at a pressure in the range 1 to 8 bar, comprises a solvent having a boiling point at 1 bar of below 20° C., and is such that water-soluble oligosaccharides are precipitated from solution by its addition in step (ii).

Viewed from a another aspect the invention provides a process for the production of an aqueous solution of fermentable sugars from a cellulosic material, said process comprising the steps of:

(i) hydrolyzing said cellulosic material with an aqueous acid to produce a hydrolysate;

(ii) extracting acid and water from said hydrolysate with a water-miscible organic extraction solvent comprising a $C_{2-3}$ ether to yield (a) a first aqueous acidic solution containing said extraction solvent and (b) a residue containing sugars;

(v) evaporating said extraction solvent from said first solution to yield (a) a second aqueous acid solution containing no more than 10% wt., preferably no more than 5% wt., of said extraction solvent and (b) gaseous extraction solvent;

(vi) condensing said gaseous extraction solvent for recycling; and, optionally, (vii) concentrating said second aqueous acid solution for recycling;

wherein said extraction solvent is liquid at the temperature and pressure of step (ii) and is such that water-soluble oligosaccharides are precipitated from solution by its addition in step (ii).

Viewed from a still further aspect the invention provides a process for the production of a sugar composition from a cellulosic material, said process comprising the steps of:

(i) hydrolyzing said cellulosic material with an aqueous acid to produce a hydrolysate;

(ii) extracting acid and water from said hydrolysate with a water-miscible organic extraction solvent comprising a $C_{2-3}$ ether to yield (a) a first aqueous acidic solution containing said extraction solvent and (b) a residue containing sugars;

(iii) drying said residue to yield said sugar composition;

(v) evaporating said extraction solvent from said first solution to yield (a) a second aqueous acid solution containing no more than 10% wt., preferably no more than 5% wt., of said extraction solvent and (b) gaseous extraction solvent;

(vi) condensing said gaseous extraction solvent for recycling; and, optionally, (vii) concentrating said second aqueous acid solution for recycling;

wherein said extraction solvent is liquid at the temperature and pressure of step (ii) and is such that water-soluble oligosaccharides are precipitated from solution by its addition in step (ii).

The acid used in the process of the invention may be any strong acid, but will generally be an inorganic acid such as phosphoric or sulphuric acid. The use of sulphuric acid is preferred. The use of hydrochloric acid is not preferred. The use of a mixture of sulphuric and phosphoric acids, e.g. in a 1:1 to 4:1 volume ratio, especially about 2:1 volume ratio, is especially preferred.

The acid solution as contacted with the cellulosic starting material preferably corresponds to an acid:water weight ratio of 1:1 to 4:1, especially about 3:1. Acid solutions of the acid strengths conventionally used in strong acid hydrolysis of cellulosic materials may be used. It should be noted that acid and water may be added separately or that the initial acid added may be diluted or concentrated to yield the desired acid:water balance.

The acid hydrolysis may be performed in conventional fashion. Typically, hydrolysis, which is exothermic, will be performed on a continuous basis, under cooling, e.g. water cooling, to maintain the hydrolysis mixture at 50 to 55° C. The acid solution:cellulosic material ratio is typically 2:1 to 4:1 by weight and the hydrolysis duration will generally be 1 to 4, especially about 2, hours. In this way the cellulose is broken down to produce oligosaccharides which can be precipitated out by the extraction solvent to yield a lignin/sugars slurry.

Contact between hydrolysate and extraction solvent is preferably effected in a counter flow column such that extraction solvent is added from below and removed from above and hydrolysate is added from above and the lignin/sugars slurry is removed from below. The slurry may be washed with extraction solvent if desired, it may be drained of liquids if desired, and it may be dried if desired. Alternatively it can be used directly for the oligosaccharide cleavage step after addition of water to bring the sugars into solution. The oligosaccharide cleavage reaction may be effected enzymatically or alternatively, and preferably, by acid hydrolysis. In practice the residue of acid retained in the unwashed slurry is adequate for oligosaccharide cleavage to proceed via such a second acid hydrolysis step. Alternatively further acid may be added, for example to bring the acid content of the sugar solution up to about 0.1 to 5 wt %, especially 0.5 to 2 wt %, particularly about 1 wt %. Addition of excess acid is undesirable as, following a second acid hydrolysis, the resulting hydrolysate must be neutralized to a pH suitable for the microorganisms responsible for fermentation (generally yeasts). This second hydrolysis may be effected under conventional conditions for weak acid hydrolysis of oligosaccharides, e.g. a temperature of 125 to 155° C., particularly about 140° C., a pressure of 2 to 7 bar, preferably 5-6 bar and a duration of about two hours.

Before fermentation, the fermentable sugars in aqueous solution are preferably filtered to recover any lignin. This is preferably washed to recover any entrained sugars for fermentation and compressed for use as a fuel, e.g. to provide energy for one or more of the steps in the overall alcohol production process.

Where the raw cellulosic material is rice straw, the lignin/sugars mixture will contain fine silica particles. These may be recovered by filtration, e.g. using differently sized meshes for lignin and silica or they may be recovered from the residue of the combustion of the lignin. Such silica particles are useful, e.g. as paint additives, pharmaceutical tabletting aids, or catalyst carriers (e.g. for olefin polymerization), and their collection and use form further aspects of the present invention. Viewed from a further aspect therefore the invention provides a process for producing particulate silicate comprising digesting rice straw with aqueous acid, precipitating sugars from the aqueous acid with a water-immiscible organic solvent, collecting the resulting mixture of precipitated sugars, lignin and particulate silica, and separating therefrom the particulate silica.

Viewed from still further aspects the invention provides a paint comprising silica particles isolated from rice straw; a pharmaceutical comprising silica particles isolated from rice straw as an excipient; and a particulate catalyst comprising silica particles isolated from rice straw and loaded with a catalyst. These products may be prepared by conventional means using other conventional ingredient.

The microorganism used in the fermentation step may in one preferred embodiment be any microorganism capable of converting fermentable sugars to alcohol, e.g. brewer's yeast. Preferably however a yeast or yeast mixture is used which can transform the pentoses yielded by hemicellulose hydrolysis as well as the hexoses yielded by cellulose hydrolysis. Such yeasts are available commercially. The use of microorganisms that can transform pentoses to alcohol (e.g. *Pichia stipitis*, particularly *P. stipitis* CBS6054), particularly in combination with ones which can transform hexoses to alcohol, is especially preferred. Where fermentation is performed using microorganisms other than brewer's yeast (e.g. *C. beijerinckii* BA101), alcohols other than ethanol, in particular butanol, can be produced and these too can be used as biofuels. The invention covers the production of such other alcohols.

Distillation may be effected in conventional fashion.

The sugars produced using the invention can be fermented or respired by Baker's yeast or other microorganisms yeast to yield many different biological produced compounds such as glycerol, acetone, organic acids (e.g. butyric acid, lactic acid, acetic acid), hydrogen, methane, biopolymers, single cell protein (SCP), antibiotics and other pharmaceuticals. Specific proteins, enzymes or other compounds could also be extracted from cells grown on the sugars. The sugars moreover may be transformed into desired end products by chemical and physical rather than biological means, e.g. reflux boiling or dehydration of xylose will yield furfural. The invention thus also covers the production of all such other produced compounds besides alcohols.

The apparatus used in the processes of the invention typically comprises: a hydrolysis reactor; a first separator arranged to receive hydrolysate from said reactor and to discharge a sugar slurry; a second separator arranged to receive an extraction solvent/water mixture (i.e. extraction solvent and acid) from said first separator and to discharge an aqueous acid solution; an acid reservoir arranged to supply acid to said reactor; an extraction solvent reservoir arranged to supply an organic extraction solvent to said first separator; and a condenser arranged to receive gaseous extraction solvent from said second separator and to discharge said extraction solvent in liquid form for recycling.

The apparatus preferably also comprises components for recycling the acid and extraction solvent, and for feeding cellulosic material to the reactor. Conveniently, it also comprises components for the downstream handling of the sugar slurry, e.g. further hydrolysis reactors, reservoirs for a base for neutralizing the residual acid, fermentors and distillation units.

To allow for continuous operation of the process when individual steps are performed batchwise, individual units within the apparatus may be duplicated, i.e. with such units being in parallel, so that one may be in operation while the other is being loaded/unloaded. This is particularly the case for the second acid hydrolysis, the fermentation, the distillation, and the lignin separation steps.

Figure 2:
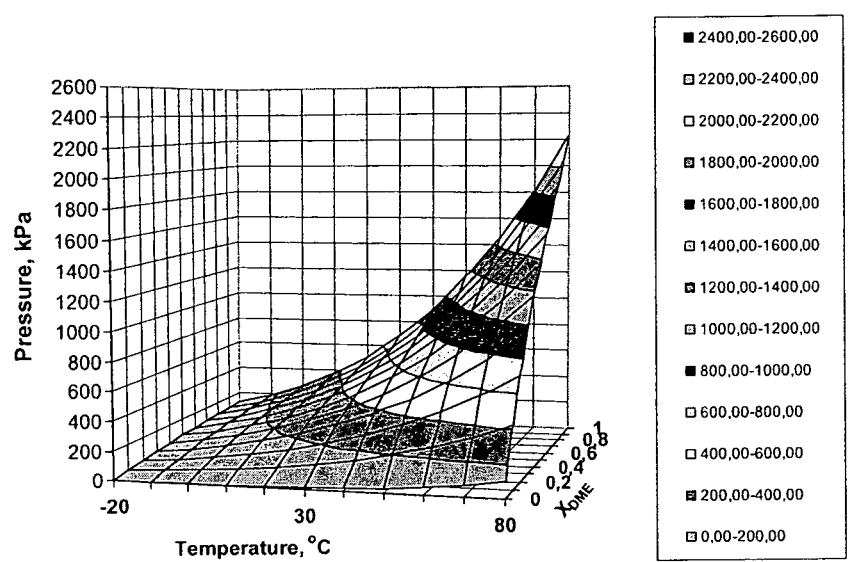
FIG. 2 is a three-dimensional plot of the vapour pressure of mixtures of dimethyl ether and ethanol in the temperature range −20 to +85° C.
Figure 3:
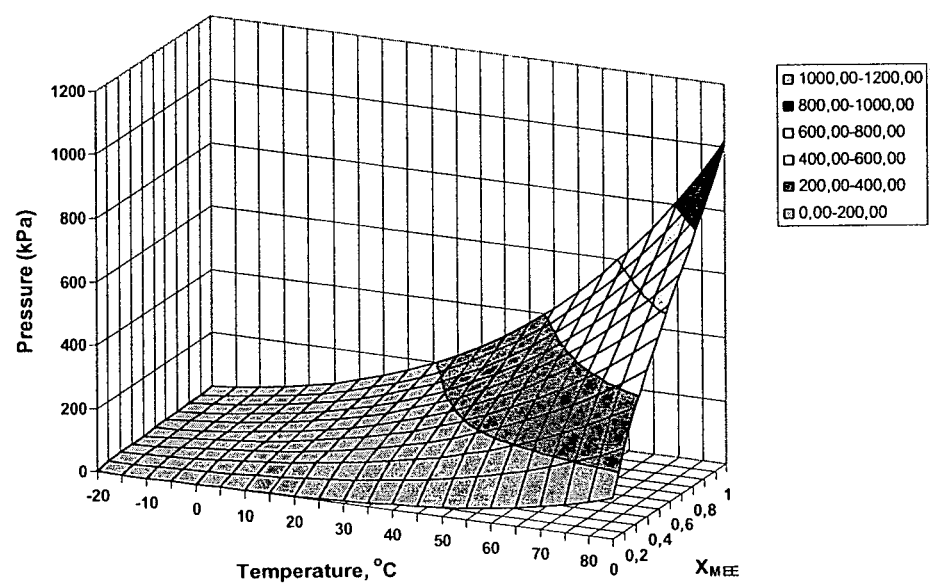
FIG. 3 is a three-dimensional plot of the vapour pressure of mixtures of methyl ethyl ether and ethanol in the temperature range −20 to +85° C.
Figure 4:
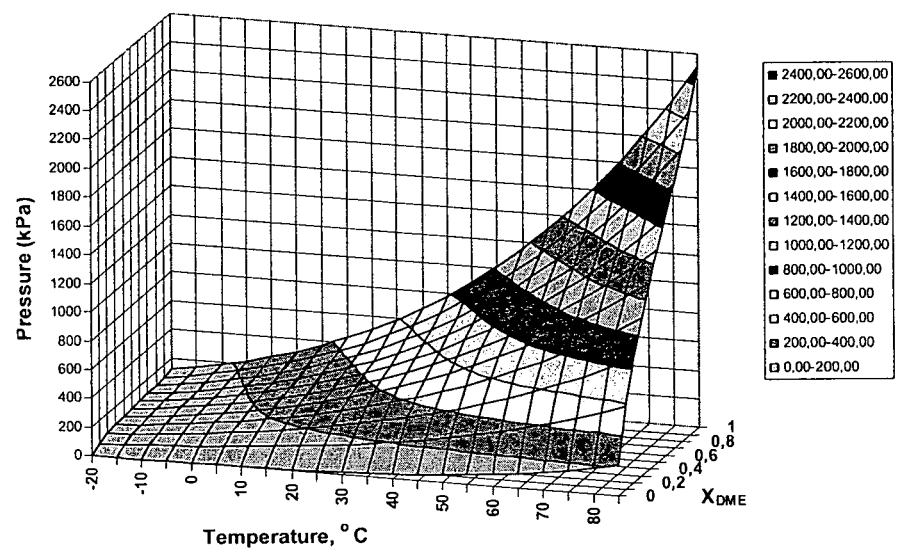
FIG. 4 is a three-dimensional plot of the vapour pressure of mixtures of dimethyl ether and methanol in the temperature range −20 to +85° C.

Embodiments of the invention will now be described further with reference to the following non-limiting Examples and the accompanying drawings, in which FIG. 1 is a schematic diagram of an apparatus according to the invention;

FIG. 2 is a three-dimensional plot of the vapour pressure of mixtures of dimethyl ether and ethanol in the temperature range −20 to +85° C.; and FIG. 3 is a three-dimensional plot of the vapour pressure of mixtures of methyl ethyl ether and ethanol in the temperature range −20 to +85° C.;

FIG. 4 is a three-dimensional plot of the vapour pressure of mixtures of dimethyl ether and methanol in the temperature range −20 to +85° C.

Referring to FIG. 1, there is shown an apparatus 1 for the conversion of wood pulp to alcohol. Wood pulp 2 is fed from hopper 3 into a hydrolysis reactor 4 containing a rotating screw operated to ensure a residence time for the wood pulp within the reactor of about two hours. The reactor is provided with a water-cooling jacket to maintain the hydrolysis mixture at about 50-55° C. Sulphuric and phosphoric acids and water, in a weight ratio of 2:1:1 are fed into reactor 4 from reservoirs 5 and 6, water feed line 7, and acid recycling reservoir 23. The hydrolysate from reactor 4 is fed to the top of a counterflow separation column 8 having internal plates 9 to delay through flow. Into the base of column 8 is introduced an organic extraction solvent, a 3.25:1 by weight mixture of dimethyl ether and ethanol, from reservoir 29. Within the column 8, water and acid are taken up by the extraction solvent and lignin and precipitated sugars are passed from the base of the column to a continuous filtration unit 10. The acid/water/extraction solvent mixture is discharged from the top of column 8 and fed into a separator column 11.

The solid residue from filtration unit 10 is passed to a drier 12 and the dry lignin/sugar mixture is then dissolved in water and passed into a second hydrolysis reactor 13. The liquid from the filtration unit 10 is passed to separator column 11.

In the second reactor 13, a further acid hydrolysis is effected at 140° C. for two hours at 5-6 bar. The hydrolysate is filtered in filtration unit 14 to remove lignin (which is compressed and combusted to provide energy for the overall apparatus). The remaining solution of fermentable sugars is neutralized with calcium carbonate in neutralization unit 15 before being passed to fermentation unit 16 where brewers' yeast is added and fermentation is allowed to take place. The fermented mixture is then fed to distillation unit 17 where alcohol is distilled off via line 18.

The acid/water/extraction solvent in separator column 11 is depressurized to cause the extraction solvent to evaporate. The gaseous extraction solvent is led from separator column 11 to a condenser 20 where the pressure is increased sufficiently to liquefy the extraction solvent and the liquid extraction solvent is recycled via line 21 to reservoir 29. The remaining aqueous acid is fed from separator column 11 to evaporator unit 22 where water is removed under vacuum. The remaining acid, containing some dissolved sugar, is recycled to reservoir 23.

EXAMPLE 1

Acid Hydrolysis of Waste Wood 289 g of a 55.3% wt. aqueous solution of sulphuric and phosphoric acids in a mass ratio of 2:1 was mixed with 50 g of sawdust from demolition wood. The resultant suspension was kept at 50° C. for 2 hours and 40 minutes and then cooled to 20° C.

The acid solution used in this Example may be prepared from dilute recirculated acid (0.81 liters, containing 160 g sulphuric and phosphoric acids in a 2:1 weight ratio) by evaporation of water to a 55.3% wt acid content.

EXAMPLE 2

Solvent Extraction of Acid from Cellulose Hydrolysate

After cooling the suspension from Example 1, 250 ml ethanol (96% wt. ethanol with 2% wt. methyl isobutyl ketone) was added and the mixture was transferred to a pressure vessel in which 605 g of dimethyl ether was added. The suspension was filtered in the pressure vessel. The filter cake of lignin and precipitated sugars was then suspended in water to a total volume of 0.8 liters.

Through evaporating off the remaining solvent (ethanol and dimethyl ether), the volume of this suspension was reduced to 0.3 liters and then it was filtered.

EXAMPLE 3

Solvent Extraction of Acid from Cellulose Hydrolysate

After cooling the suspension from Example 1, 250 ml ethanol (96% wt. ethanol with 2% wt. methyl isobutyl ketone) was added and the mixture was transferred to a pressure vessel having two compartments (an inlet compartment and an outlet compartment) separated by a sintered glass plate and 0.56 kg of dimethyl ether was added. The dimethyl-ether was recycled dimethyl ether from previous experiments which had used dimethyl ether as the extraction solvent. The suspension was filtered in the pressure vessel. The volatile fraction of the filtrate was continuously withdrawn and re-pressurized in a piston compressor. The re-pressurized vapour was continuously condensed and fed to a pressure vessel and used as extraction solvent in subsequent experiments. Total ether fraction reclaimed as liquid ether was 0.33 kg (59% of added ether).

The filter cake of lignin and precipitated sugars was then suspended in water to a total volume of 0.8 liters.

Through evaporating off the remaining solvent (ethanol and dimethyl-ether), the volume of this suspension was reduced to 0.3 liters and then it was filtered.

EXAMPLE 4

Subsequent Treatment of Recovered Slurry to Produce Ethanol

This Example demonstrates that, following use of dimethyl ether as the extraction solvent, i.e. in Examples 2 and 3 above, the sugars, both those precipitated and those remaining in solution, can be further processed by oligosaccharide cleavage and fermentation to produce ethanol. Thus, the filtrate from Example 2, comprising dissolved sugars and washing water, was partly neutralized by addition of calcium carbonate whereby the remaining sulphuric acid precipitated as gypsum and was filtered out. The filter cake from Example 2 was then added to the partly neutralized sugar solution and the resultant mixture was heated for two hours at 140° C. in a laboratory autoclave. The suspension was then filtered and the filtrate, i.e. the sugar solution, was neutralized with calcium carbonate to pH 4.5. The dissolved sugar was fermented conventionally using ordinary baker's yeast (*Saccaharomyces cerevisiae*).

The yield of ethanol was determined by gas chromatography analysis of the solution. The ethanol yield after fermentation was 11.32 ml.

The total calcium carbonate consumption for neutralizing the remaining acid in the hydrolysate and in the sugar solution was 28.6 g, which corresponds to 17.5% of the added acid.

EXAMPLE 5

Reproduction of Examples 1 to 4

Diluted re-circulated acid from the same stock as used in Example 1, containing 156 g sulphuric and phosphoric acid, weight ratio 2:1, was re-concentrated to 53.5% wt. acid solution by evaporation of water. The concentrated acid solution, 292 g, was mixed with 50 g of sawdust from demolition wood. The resulting suspension was kept at 50° C. for 2 hours and 40 minutes and then cooled to 20° C.

The suspension was mixed with 250 ml ethanol and transferred to a pressure vessel. Recycled dimethyl-ether, 0.61 kg, was added to the pressure vessel and the suspension was filtered in the pressure vessel.

The volatile fraction of the filtrate was continuously withdrawn and re-pressurized in a piston compressor. The re-pressurized vapour was continuously condensed and fed to a pressure vessel and used as extraction solvent in subsequent experiments. Total ether fraction reclaimed as liquid ether was 0.28 kg (46% of added ether).

The filter cake, containing solid lignin and precipitated sugars, was processed further according to Examples 2-4.

Total amount of calcium carbonate added to neutralize the sugar solution to pH=4.5 was 34.9 g which corresponds to 21.9% of the added acid.

Ethanol yield from fermentation of the neutralised sugar solution was 11.68 ml.

EXAMPLE 6

Recycling and Reuse of Mineral Acid from Examples 1 to 4

The liquid fraction of filtrate from Examples 3 and 5, containing 82.5% of the mineral acid used in Example 1 to 4 plus residual ethanol and dimethyl-ether, was transferred to a glass bottle. Residual dimethyl ether and ethanol were boiled off in a rotary evaporator at slightly reduced pressure and a temperature of ca 50° C.

The residual acid solution was diluted with water in order to precipitate acid soluble lignin and filtrated. The acid concentration in the filtrate was 34.6% by weight analysed with acid-base titration. A liquid volume of the filtrate, 0.46 liter, containing 160 g pure mineral acid and a weight ratio $m_{H2SO4}/m_{H3PO4}=1.6$, was evaporated in a rotary evaporator to an acid concentration of 54.1 weight.

The re-concentrated acid solution was mixed with 50 g of sawdust from demolition wood. The resultant suspension was kept at 50° C. for 2 hours and 30 minutes and then cooled to 20° C.

After cooling the suspension of hydrolyzed wood and solid lignin was mixed with 250 ml ethanol. The mixture was transferred to a pressure vessel. Dimethyl-ether, 0.63 kg, was added to the pressure vessel. The suspension containing precipitated sugar and solid lignin was filtered in the pressure vessel and the volatile fraction of the filtrate continuously recompressed with a piston compressor. The repressurized vapour was continuously condensed and fed to a pressure vessel and used as extraction solvent in subsequent experiments. Total ether fraction reclaimed as liquid ether was 0.37 kg (59% of added ether).

The filter cake of lignin and precipitated sugars was then suspended in water to a total volume of 0.8 liters. Through evaporating off the remaining solvent (ethanol and dimethyl ether), the volume of this suspension was reduced to 0.3 liters and then it was filtered.

Subsequent treatment of recovered slurry to produce ethanol was according to Example 4. Total consumption of Calcium carbonate to neutralise the sugar solution to pH=4.5 was 25.8 g, corresponding to 15.8% of mineral acid used in hydrolyzing sawdust from demolition wood.

Ethanol yield from fermentation of the neutralized sugar solution was 9.81 ml.

EXAMPLE 7

TP Window for Solvent Mixtures

The approximate vapour pressures, in kPa, for mixtures of ethanol and dimethyl ether between −20 and +85° C. are set out in Table 1 below (% is % dimethyl ether by weight). The figures are also plotted in FIG. 2. As can be seen a temperature/pressure window of 25-60° C. and 1-8 bar is accessible with dimethyl ether relative contents of about 10-100%.

TABLE 1

| T,° C. | 0 | 10 | 20 | 30 | 40 | 50 | 60 | 70 | 80 | 90 | 100 |
|---|---|---|---|---|---|---|---|---|---|---|---|
| −20 | 0 | 13 | 25 | 37 | 50 | 62 | 74 | 86 | 99 | 111 | 123 |
| −15 | 0 | 16 | 31 | 46 | 61 | 76 | 91 | 106 | 121 | 136 | 151 |
| −5 | 1 | 23 | 45 | 67 | 89 | 111 | 134 | 156 | 178 | 200 | 222 |
| 0 | 2 | 28 | 54 | 81 | 107 | 134 | 160 | 186 | 213 | 239 | 266 |
| 5 | 2 | 34 | 65 | 96 | 128 | 159 | 190 | 222 | 253 | 284 | 316 |
| 10 | 3 | 40 | 77 | 114 | 151 | 188 | 225 | 262 | 299 | 336 | 373 |
| 15 | 4 | 48 | 91 | 134 | 178 | 221 | 264 | 308 | 351 | 394 | 438 |
| 20 | 6 | 56 | 107 | 157 | 208 | 258 | 309 | 359 | 409 | 460 | 510 |
| 25 | 8 | 66 | 125 | 183 | 242 | 300 | 358 | 417 | 475 | 534 | 592 |
| 30 | 11 | 78 | 145 | 212 | 280 | 347 | 414 | 481 | 548 | 616 | 683 |
| 35 | 14 | 91 | 168 | 245 | 322 | 399 | 476 | 553 | 630 | 707 | 784 |
| 40 | 18 | 106 | 194 | 281 | 369 | 457 | 545 | 632 | 720 | 808 | 896 |
| 45 | 23 | 123 | 222 | 322 | 421 | 521 | 620 | 720 | 819 | 919 | 1019 |
| 50 | 30 | 142 | 254 | 367 | 479 | 592 | 704 | 816 | 929 | 1041 | 1153 |
| 55 | 38 | 164 | 290 | 416 | 543 | 669 | 795 | 922 | 1048 | 1174 | 1301 |
| 60 | 47 | 189 | 330 | 471 | 613 | 754 | 895 | 1037 | 1178 | 1320 | 1461 |
| 65 | 59 | 216 | 374 | 532 | 689 | 847 | 1005 | 1162 | 1320 | 1478 | 1635 |
| 70 | 72 | 248 | 423 | 598 | 773 | 948 | 1123 | 1298 | 1473 | 1648 | 1824 |
| 75 | 89 | 283 | 476 | 670 | 864 | 1058 | 1252 | 1445 | 1639 | 1833 | 2027 |
| 80 | 108 | 322 | 536 | 749 | 963 | 1177 | 1391 | 1604 | 1818 | 2032 | 2246 |
| 85 | 131 | 366 | 601 | 836 | 1071 | 1306 | 1540 | 1775 | 2010 | 2245 | 2480 |

The approximate vapour pressures, in kPa, for mixtures of ethanol and methyl ethyl ether between −20 and +85° C. are plotted in FIG. 3. As can be seen a temperature/pressure window of 25-60° C. and 1-8 bar is accessible with methyl ethyl ether/ethanol mixtures.

The approximate vapour pressures, in kPa, for mixtures of methanol and dimethylether between −20 and +85° C. are plotted in FIG. 4. As can be seen a temperature/pressure window of 25-60° C. and 1-8 bar is accessible with dimethylether/methanol mixtures.

The invention claimed is:

1. A process for the production of a residue containing sugars from a cellulosic material, said process comprising the steps of:
   (i) hydrolyzing said cellulosic material with an aqueous acid to produce a hydrolysate;
   (ii) extracting acid and water from said hydrolysate with a water-miscible organic extraction solvent to yield (a) a first aqueous acidic solution containing said extraction solvent and (b) the residue containing sugars;
   (iii) evaporating said extraction solvent from said first solution to yield (a) a second aqueous acid solution containing no more than 10% wt. of said extraction solvent and (b) gaseous extraction solvent;
   (iv) condensing said gaseous extraction solvent for recycling; and, optionally,
   (v) concentrating said second aqueous acid solution for recycling;
   wherein said extraction solvent is liquid at the temperature and pressure of step (ii), has a boiling point of from 25 to 60° C. at a pressure in the range 1 to 8 bar, comprises a solvent having a boiling point at 1 bar of below 20° C., and is such that water-soluble oligosaccharides are precipitated from solution by its addition in step (ii).

2. The process as claimed in claim 1, further comprising the steps of:
   subjecting said residue containing sugars to an oligosaccharide cleavage reaction to yield an aqueous solution of fermentable sugars; and
   fermenting said fermentable sugars and distilling alcohol from the resulting fermented mixture.

3. The process as claimed in claim 1, said process further comprising the step of:
   drying said residue containing sugars to yield a sugar composition.

4. The process as claimed in any one of claims 2, 1 or 3, wherein said extraction solvent comprises a $C_{2-3}$ ether.

5. A process for the production of a residue containing sugars from a cellulosic material, said process comprising the steps of:
   (i) hydrolyzing said cellulosic material with an aqueous acid to produce a hydrolysate;
   (ii) extracting acid and water from said hydrolysate with a water-miscible organic extraction solvent comprising a $C_{2-3}$ ether to yield (a) a first aqueous acidic solution containing said extraction solvent and (b) the residue containing sugars;
   (iii) evaporating said extraction solvent from said first solution to yield (a) a second aqueous acid solution containing no more than 10% wt. of said extraction solvent and (b) gaseous extraction solvent;
   (iv) condensing said gaseous extraction solvent for recycling; and, optionally,
   (v) concentrating said second aqueous acid solution for recycling;
   wherein said extraction solvent is liquid at the temperature and pressure of step (ii) and is such that water-soluble oligosaccharides are precipitated from solution by its addition in step (ii).

6. The process as claimed in claim 5, said process further comprising the steps of:
   subjecting said residue containing sugars to an oligosaccharide cleavage reaction to yield an aqueous solution of fermentable sugars; and
   fermenting said fermentable sugars and distilling alcohol from the resulting fermented mixture.

7. The process as claimed in claim 5, said process further comprising the step of:
   drying said residue containing sugars to yield a sugar composition.

8. The process as claimed in any one of claims 2, 1, 3, 6, 5 or 7 wherein extraction step (ii) is performed at a temperature within 15° C. and a pressure within 1 bar of the temperature and pressure of hydrolysis step (i).

9. The process as claimed in any one of claims 2, 1, 3, 6, 5 or 7 wherein evaporation step (iii) is performed at a temperature within 15° C. and a pressure within 5 bar of the temperature and pressure of extraction step (ii).

10. The process as claimed in any one of claims 2, 1, 3, 6, 5 or 7 wherein condensation step (iv) is performed at a temperature within 15° C. and a pressure within 1 bar of the temperature and pressure of extraction step (ii).

11. A process for the production of a residue containing sugars from a cellulosic material, said process comprising the steps of:
    (i) hydrolyzing said cellulosic material with an aqueous acid to produce a hydrolysate;
    (ii) extracting acid and water from said hydrolysate with a water-miscible organic extraction solvent to yield (a) a first aqueous acidic solution containing said extraction solvent and (b) the residue containing sugars;
    (iii) evaporating said extraction solvent from said first solution to yield (a) a second aqueous acid solution containing no more than 10% wt. of said extraction solvent and (b) gaseous extraction solvent;
    (iv) condensing said gaseous extraction solvent for recycling; and, optionally,
    (v) concentrating said second aqueous acid solution for recycling;
    wherein said extraction solvent is liquid at the temperature and pressure of step (ii), has a boiling point of from 25 to 60° C. at a pressure in the range 1 to 8 bar, and is such that water-soluble oligosaccharides are precipitated from solution by its addition in step (ii), wherein extraction step (ii) is performed at a temperature within 15° C. and a pressure within 1 bar of the temperature and pressure of hydrolysis step (i), wherein evaporation step (iii) is performed at a temperature within 15° C. and a pressure within 5 bar of the temperature and pressure of extraction step (ii), and wherein condensation step (iv) is performed at a temperature within 15° C. and a pressure within 1 bar of the temperature and pressure of extraction step (ii).

12. The process as claimed in claim 11, said process further comprising the steps of:
    subjecting said residue containing sugars to an oligosaccharide cleavage reaction to yield an aqueous solution of fermentable sugars; and
    fermenting said fermentable sugars and distilling alcohol from the resulting fermented mixture.

13. The process as claimed in claim 11, said process further comprising the step of:
    drying said residue containing sugars to yield a sugar composition.

14. The process as claimed in any one of claims 12, 11 or 13 wherein extraction step (ii) is performed at a temperature within 10° C. of the temperature of hydrolysis step (i), wherein evaporation step (iii) is performed at a temperature within 10° C. of the temperature of extraction step (ii), and wherein condensation step (iv) is performed at a temperature within 10° C. of the temperature of extraction step (ii).

15. The process as claimed in any one of claims 2, 1, 3, 6, 5, 7, 12, 11 or 13 for the production of ethanol.

16. The process as claimed in any one of claims 2, 1, 3, 6, 5, 7, 12, 11 or 13 wherein said extraction solvent comprises dimethyl ether.

17. The process as claimed in claim 16 wherein said extraction solvent further comprises ethanol.

* * * * *